(12) United States Patent
Jiang (10) Patent No.: US 6,798,764 B2
(45) Date of Patent: Sep. 28, 2004

(54) WIRELESS COMMUNICATIONS DEVICE WITH A STATE MODEL

(75) Inventor: Sam Shiaw-Shiang Jiang, Hsin-Chu (TW)

(73) Assignee: ASUSTeK Computer Inc., Taipei (TW)

( * ) Notice: Subject to any disclaimer, the term of this patent is extended or adjusted under 35 U.S.C. 154(b) by 535 days.

(21) Appl. No.: 09/681,991

(22) Filed: Jul. 4, 2001

(65) Prior Publication Data

US 2003/0007478 A1 Jan. 9, 2003

(51) Int. Cl.[7] .............................................. H04Q 7/00
(52) U.S. Cl. ...................... 370/349; 370/469; 370/310
(58) Field of Search .................. 370/328, 329, 370/338, 349, 389, 463, 465, 469, 310, 352–356; 455/450, 509

(56) References Cited

U.S. PATENT DOCUMENTS 5,812,951 A * 9/1998 Ganesan et al. ............ 455/445
6,192,244 B1 * 2/2001 Abbadessa .................. 455/436
6,473,419 B1 * 10/2002 Gray et al. .................. 370/349

OTHER PUBLICATIONS

3GPP TS 25.322 V3.6.0. (Mar. 2001).
3GPP, 3rd Generation Partnership Project; Technical Specification Group Radio Access Network; RLC protocol specification(Release 1999), pp. 1–57, 3GPP TS 25.322 V3.7.0(Jun. 2000).

* cited by examiner

Primary Examiner—Ajit Patel
(74) Attorney, Agent, or Firm—Winston Hsu (57) ABSTRACT

A wireless communications device has a layer 2 interface that is designed as a finite state machine. The finite state machine includes a null state, a data transfer state, a reset pending state, a local suspend state and a reset/suspend state. In the null state, no communications channel is established. In all the other states, a communications channel is established with another communications device. In the data transfer state the communications channel is active. In the reset pending state communications is halted pending a reset acknowledge signal from the other device. In the local suspend state communications are temporarily suspended for all data after a predetermined event. The reset/suspend state explicitly supports the condition in which both rest pending and local suspend conditions are present, and enables the state machine to transition to a subsequent state without requiring knowledge of a previous state.

5 Claims, 6 Drawing Sheets

WIRELESS COMMUNICATIONS DEVICE WITH A STATE MODEL

BACKGROUND OF INVENTION

1. Field of the Invention

The present invention relates to a state model for a wireless communications device. In particular, the present invention discloses a finite state machine for the wireless device that includes a reset/suspend state.

2. Description of the Prior Art

Technological advances have moved hand in hand with more demanding consumer expectations. Devices that but ten years ago were considered cutting edge are today obsolete. These consumer demands in the marketplace spur companies towards innovation. The resulting technological advances, in turn, raise consumer expectations. Presently, portable wireless devices, such as cellular telephones, personal data assistants (PDAs), notebook computers, etc., are a high-growth market. However, the communications protocols used by these wireless devices are quite old. Consumers are demanding faster wireless access with greater throughput and flexibility. This has placed pressure upon industry to develop increasingly sophisticated communications standards. The $3^{rd}$ Generation Partnership Project (3GPP™) is an example of such a new communications protocol.

Figure 1:
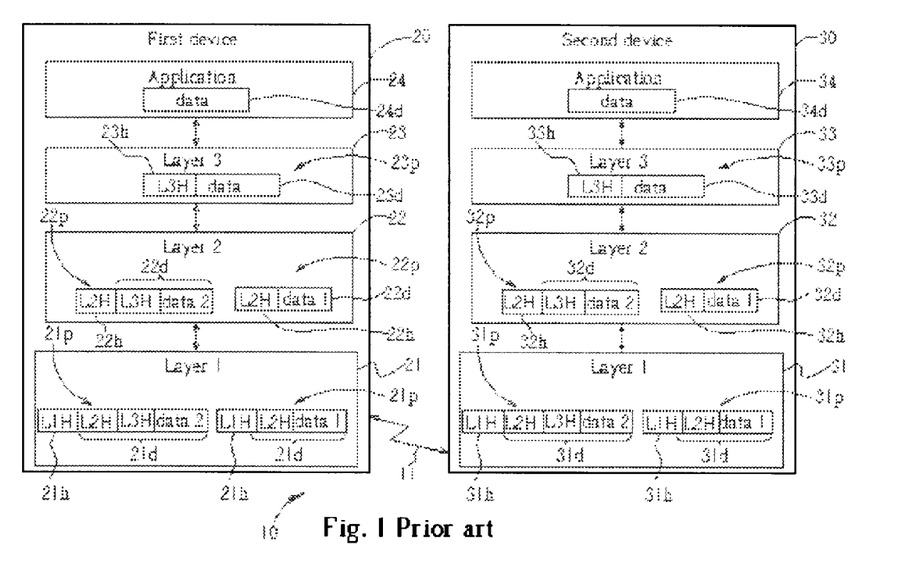
FIG. 1 is a simplified block diagram of a prior art communications model.

The 3GPP™ standard utilizes a three-layered approach to communications. Please refer to FIG. 1. FIG. 1 is a simplified block diagram of the prior art communications model. A prior art wireless system includes a first device 20 and a second device 30, both of which are in wireless communications with each other. As an example, the first device 20 may be a mobile unit, such as a cellular telephone, and the second device 30 may be a base station. An application 24 on the first device 20 needs to send data 24d to an application 34 on the second device 30. The application 24 connects with a layer 3 interface 23 (termed the radio resource control (RRC)), and passes the data 24d to the layer 3 interface 23. The layer 3 interface 23 uses the data 24d to form a layer 3 protocol data unit (PDU) 23p. The layer 3 PDU 23p includes a layer 3 header 23h and data 23d, which is identical to the data 24d. The layer 3 header 23h in the layer 3 PDU 23p contains information needed by the corresponding layer 3 interface 33 on the second device 30 to effect proper communications. The layer 3 interface 23 then passes the layer 3 PDU 23p to a layer 2 interface 22. The layer 2 interface 22 (also termed the radio link control (RLC)) uses the layer 3 PDU 23p to build one or more layer 2 PDUs 22p. Generally speaking, each layer 2 PDU 22p has the same fixed size. Consequently, if the layer 3 PDU 23p is quite large, the layer 3 PDU 23p will be broken into chunks by the layer 2 interface 22 to form the layer 2 PDUs 22p, as is shown in FIG. 1. Each layer 2 PDU 22p contains a data region 22d, and a layer 2 header 22h. In FIG. 1, the data 23d has been broken into two layer 2 PDUs 22p. Also note that the layer 3 header 23h is placed in the data region 22d of a layer 2 PDU 22p. The layer 3 header 23h holds no significance for the layer 2 interface 22, and is simply treated as data. The layer 2 interface 22 then passes the layer 2 PDUs 22p to a layer 1 interface 21. The layer 1 interface 21 is the physical interface, and does all the actual transmitting and receiving of data. The layer 1 interface 21 accepts the layer 2 PDUs 22p and uses them to build layer 1 PDUs 21p. As with the preceding layers, each layer 1 PDU 21p has a data region 21d and a layer 1 header 21h. Note that the layer 3 header 23h and layer 2 headers 22h are no more important to the layer 1 interface 21 than the application data 24d. The layer 1 interface 21 then transmits the layer 1 PDUs 21p to the second device 30.

A reverse process occurs on the second device 30. After receiving layer 1 PDUs 31p from the first device 20, a layer 1 interface 31 on the second device 30 removes the layer 1 headers 31h from each received layer 1 PDU 31p. This leaves only the layer 1 data regions 31d, which are, in effect, layer 2 PDUs. These layer 1 data regions 31d are passed up to a layer 2 interface 32. The layer 2 interface 32 accepts the layer 2 PDUs 32p and uses the layer 2 headers 32h to determine how to assemble the layer 2 PDUs 32p into appropriate layer 3 PDUs. In the example depicted in FIG. 1, the layer 2 headers 32h are stripped from the layer 2 PDUs 32p, leaving only the data regions 32d. The data regions 32d are appended to each other in the proper order, and then passed up to the layer 3 interface 33. The layer 3 interface 33 accepts the layer 3 PDU 33p from the layer 2 interface 32, strips the header 33h from the layer 3 PDU 33p, and passes the data region 33d to the application 34. The application 34 thus has data 34d that should be identical to the data 24d sent by the application 24 on the first device 20.

Figure 2:
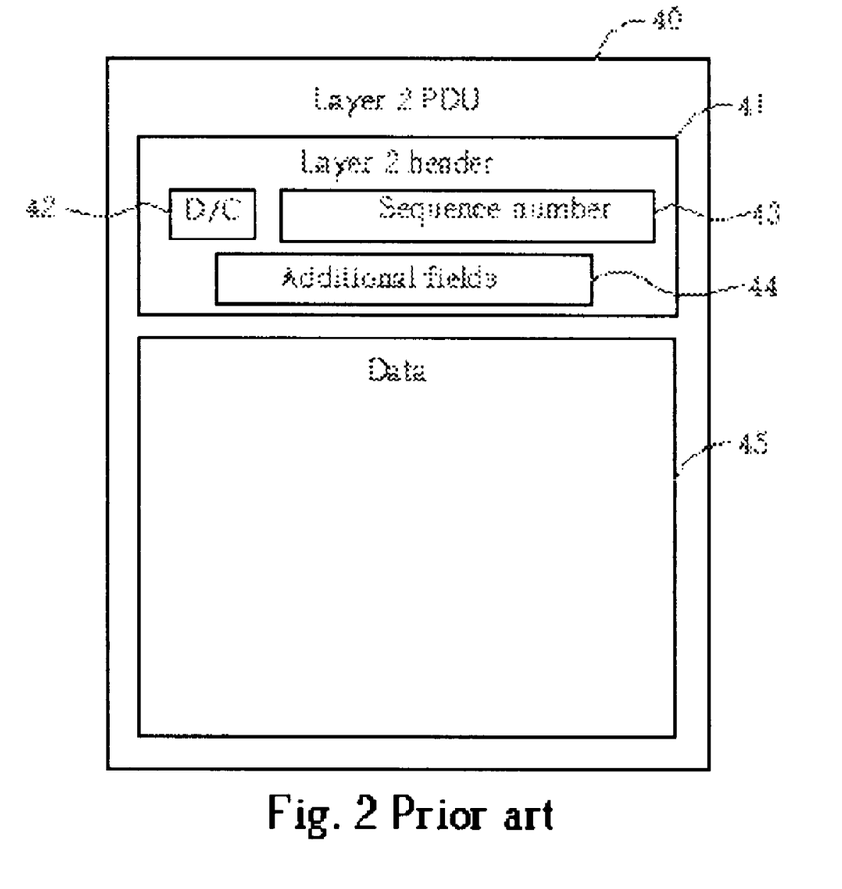
FIG. 2 is simplified block diagram of a layer 2 protocol data unit (PDU).

Please refer to FIG. 2 in conjunction with FIG. 1. FIG. 2 is simplified block diagram of a layer 2 PDU 40. The layer 2 PDU 40 has a layer 2 header 41 and a data region 45. As noted above, the data region 45 is used to carry layer 3 PDUs 23p received from the layer 3 interface 23. The layer 2 header 41 includes a data/control indicator bit 42, a sequence number field 43, and additional fields 44. The additional fields 44 are not of direct relevance to the present invention, and so will not be discussed. The data/control bit 42 is used to indicate if the layer 2 PDU 40 is a data PDU or a control PDU. Data PDUs are used to carry layer 3 data. Control PDUs are generated internally by the layer 2 interface 22, 32 and are used exclusively for signaling between the layer 2 interfaces 22 and 32, such as the passing of reset and reset acknowledgment signals. Control PDUs are thus never passed up to the layer 3 interface 23, 33. The sequence number field 43 contains a 12-bit or 7-bit value that is used to reassemble the layer 2 PDUs 40 into layer 3 PDUs 33p. Each layer 2 PDU 22p is transmitted with a successively higher value in the sequence number field 43, and in this manner the layer 2 interface 32 knows the correct ordering of received layer 2 PDUs 32p.

Figure 3:
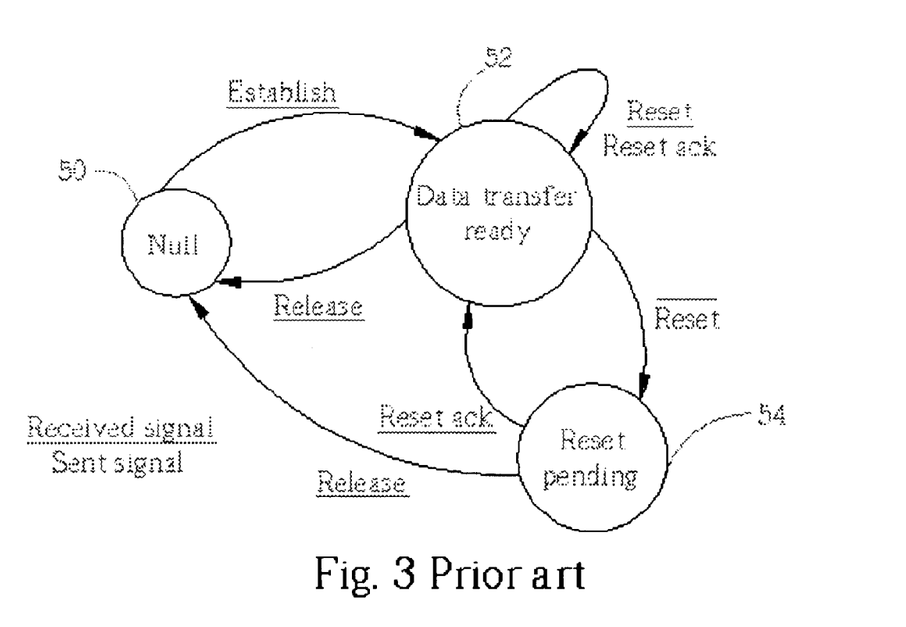
FIG. 3 depicts a state model for a prior art layer 2 interface when a reset command is performed.
Figure 4:
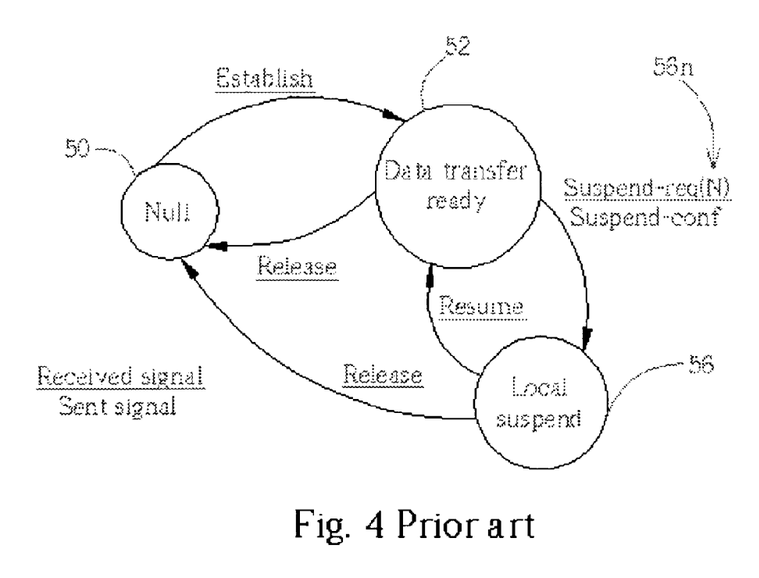
FIG. 4 depicts a state model for a prior art layer 2 interface when a local suspend command is performed.

Please refer to FIGS. 3 and 4 in conjunction with FIGS. 1 and 2. FIGS. 3 and 4 are state model diagrams of a prior art layer 2 interface. The prior art layer 2 interface 22, 32 is designed as a finite state machine. FIG. 3 depicts the state model for the layer 2 interface 22, 32 when a reset command is performed. FIG. 4 depicts the state model when a local suspend command is performed. Transitions between states are noted by arrows in FIGS. 3 and 4. Received signals associated with a state transition are noted above a horizontal line, and signals sent in response to the state transition are noted below the horizontal line. The layer 2 interface 22, 32 includes a null state 50, a data transfer ready state 52, a reset pending state 54 and a local suspend state 56. To explain these state models, the first device 20 will be used as an example. When the layer 2 interface 22 is in the null state 50, the layer 2 interface 22 has no established wireless channel 11 with the second device 30. The layer 2 interface 22 of the first device 20 thus cannot transmit any layer 2 PDUs 22p to the second device 30. When the application 24 determines that it wishes to send the data 24d to the application 34, the application 24 signals this intent to the layer 3 interface 23. The layer 3 interface 23 then performs whatever functions are necessary to establish the channel 11 with the second device 30. In particular, the layer 3 interface 23 sends an establish primitive to the layer 2 interface 22. On reception of the establish primitive, the layer 2 interface 22 transitions from the null state 50 to the data transfer state 52. In the process of doing so, the layer 2 interface 22 establishes the wireless channel 11 with the second device 30. While in the data transfer ready state 52, the first device 20 can freely transmit layer 2 PDUs 22p along the channel 11. At any time when the layer 2 interface 22 is in the data transfer state 52 and receives a release primitive from the layer 3 interface 23, the layer 2 interface 22 will transition back to the null state 50. In the process of doing so, the layer 2 interface 22 will close down the channel 11.

From time to time, the layer 2 interface 22 may determine that communications along the channel 11 are malfunctioning. In this case, the layer 2 interface 22 will desire to reset the communications system. To ensure that the entire system is reset, both the first device 20 and the second device 30 must be reset. To reset the second device 30, the layer 2 interface 22 generates a reset control PDU, and sends the reset control PDU along the channel 11 to the layer 2 interface 32 on the second device 30. The layer 2 interface 22 on the first device 20 then transitions from the data transfer state 52 to the reset pending state 54. While in the reset pending state 54, the layer 2 interface 22 will transmit no PDUs 22p to the second device 30 along the channel 11. This effectively halts communications along the channel 11. The layer 2 interface 22 remains in the reset pending state 54 until reception of a reset acknowledgment control PDU from the layer 2 interface 32 on the second device 30. This reset acknowledgment control PDU informs the layer 2 interface 22 that the layer 2 interface 32 received the reset control PDU and internally reset the layer 2 interface 32. When the layer 2 interface 22 receives the reset acknowledgment control PDU, the layer 2 interface 22 transitions from the reset pending state 54 to the data transfer ready state 52, and in the process of doing so resets the entire layer 2 state machine 22, such as flushing transmission and reception buffers, setting control variables to default values, etc. Communications along channel 11 are in this way reset back to default conditions so as to reestablish normal communications between the first device 20 and the second device 30. If at any time while the layer 2 interface 22 is in the reset pending state 54 and the layer 2 interface 22 receives a release primitive from the layer 3 interface 23, the layer 2 interface will transition to the null state 50. In the process of doing so, the layer 2 interface 22 will close down the channel 11. Also note that the layer 2 interface 22 may receive a reset control PDU from the layer 2 interface 32 of the second station 30 while in the data transfer ready state 52. Upon reception of such a layer 2 control PDU, the layer 2 interface 22 will internally reset the layer 2 interface state machine 22 for the channel 11, and then transmit a reset acknowledgment control PDU to the layer 2 interface 32. The layer 2 interface 22 remains, however, in the data transfer ready state 52 during this exchange.

The local suspend state 56 is used to temporarily halt the transfer of layer 2 PDUs 22p along the channel 11, and is initiated by a suspend-request primitive from the layer 3 interface 23. The primary purpose of the local suspend state 56 is to ensure a proper ciphering configuration change between the first device 20 and the second device 30 along the channel 11. At any time while in the data transfer ready state 52, the layer 2 interface 22 may transition to the local suspend state 56 upon reception of the suspend-request primitive from the layer 3 interface 23. The suspend-request primitive contains a variable N 56n, which indicates a sequence number value 43. While in the local suspend state 56, the layer 2 interface 22 may transmit along channel 11 layer 2 PDUs 22p with sequence number values 43 that are sequentially before a value indicated by N 56n. Any layer 2 PDU 22p having a sequence number value 43 that is sequentially after the value indicated by N 56n will not be transmitted by the layer 2 interface 22p along the channel 11. Upon reception of a resume primitive from the layer 3 interface 23, the layer 2 interface 22 will transition from the local suspend state 56 back to the data transfer ready state 52.

The prior art state models of FIGS. 3 and 4 cannot account for transitions between the local suspend state 56 and the reset pending state 54, although such transitions are assumed possible. For example, it is not difficult to imagine a situation arising in which, while the layer 2 interface 22 is in the local suspend state 56, the layer 2 interface 22 detects a communications error along the channel 11 and desires to initiate a reset procedure. Sending a reset control PDU to the second device 30 along the channel 11 would force the layer 2 interface 22 to transition into the reset pending state 54 to await the resulting reset acknowledgment control PDU from the layer 2 interface 32 of the second device 30. According to the state model of FIG. 3, reception of the reset acknowledgment control PDU should cause the layer 2 interface 22 to transition into the data transfer ready state 52. This would be incorrect in this situation, however, as the layer 2 interface should more properly return back to the local suspend state 56. To properly implement the prior art state model, the reset pending state 54 and the local suspend state 56 cannot be "memoryless" states, but must remember from which state they transitioned so as to properly return to that state. Generally speaking, a proper state model should have no hysteresis, i.e., the reaction of a state to inputs should not depend upon past reactions but only upon the present inputs, as this leads to a simpler and more consistent implementation. Internal consistency is essential to avoid programming bugs arising from unexpected state interactions within the model.

SUMMARY OF INVENTION

It is therefore a primary objective of this invention to provide a wireless communications device with a state model having a reset/suspend state to provide internal consistency to the state model, and to avoid previous state memory requirements of the state model.

Briefly summarized, the preferred embodiment of the present invention discloses a wireless communications device that transacts muti-layered communications with a second wireless device. The wireless communications device has a processor, and a program in memory that is executed by the processor to effect a multi-layered communications protocol. The multi-layered communications protocol has a layer 3 interface in communications with a layer 2 interface. The layer 2 interface transmits and receives layer 2 communications data. The layer 2 interface utilizes a null state, a data transfer state, a reset pending state, a local suspend state and a reset/suspend state. While in the null state, the layer 2 interface has no established layer 2 wireless connection with the second wireless device. While in the data transfer state, the layer 2 interface is in wireless communications with a layer 2 interface on the second wireless device and transmits the layer 2 communications data to the layer 2 interface on the second wireless device. The processor switches from the null state to the data transfer state according to an establish primitive from the layer 3 interface, and switches from the data transfer state to the null state according to a release primitive from the layer 3 interface. While in the reset pending state, the layer 2 interface is in wireless communications with the layer 2 interface on the second wireless device and the transmission of the layer 2 communications data is halted. The processor switches from the data transfer state to the reset pending state when a protocol error is found by the layer 2 interface, switches from the reset pending state to the data transfer state according to a reset acknowledge signal received from the second wireless device, and switches from the reset pending state to the null state according to the release primitive from the layer 3 interface. While in the local suspend state, the layer 2 interface is in wireless communications with the layer 2 interface on the second wireless device and halts the transmission of the layer 2 communications data after a predetermined event indicated by the layer 3 interface. The processor switches from the data transfer state to the local suspend state according to a suspend primitive from the layer 3 interface, switches from the local suspend state to the data transfer state according to a resume primitive from the layer 3 interface, and switches from the local suspend state to the null state according to the release primitive from the layer 3 interface. Finally, while in the reset/suspend state, the layer 2 interface is in wireless communications with the layer 2 interface on the second wireless device and the transmission of the layer 2 communications data is halted. The processor switches from the reset/suspend state to the reset pending state according to the resume primitive from the layer 3 interface, switches from the reset pending state to the reset/suspend state according to the suspend primitive from the layer 3 interface, switches from the reset/suspend state to the local suspend state according to the reset acknowledge signal received from the second wireless device, switches from the local suspend state to the reset/suspend state when a protocol error is found by the layer 2 interface, and switches from the reset/suspend state to the null state according to the release primitive from the layer 3 interface.

It is an advantage of the present invention that by providing the reset/suspend state, the state machine of the layer 2 interface requires no memory of previous states when transitioning to subsequent states. The state model is thus more internally consistent, and therefore easier to implement and less likely to be error-prone.

These and other objectives of the present invention will no doubt become obvious to those of ordinary skill in the art after reading the following detailed description of the preferred embodiment, which is illustrated in the various figures and drawings.

DETAILED DESCRIPTION

In the following description, a wireless communications device may be a mobile telephone, a handheld transceiver, a base station, a personal data assistant (PDA), a computer, or any other device that requires a wireless exchange of data. It should be understood that many means may be used for the physical layer 1 to effect wireless transmissions, and that any such means may be used for the system hereinafter disclosed.

Figure 5:
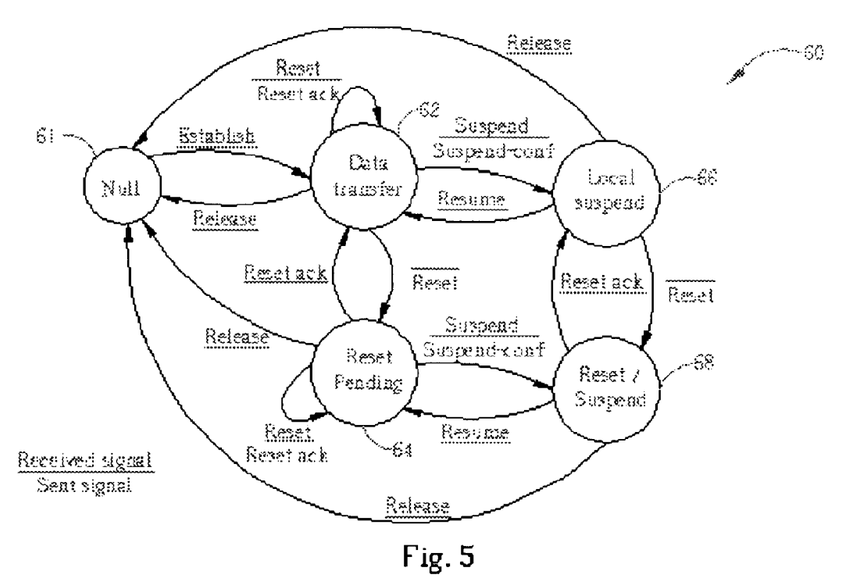
FIG. 5 illustrates a state model according to the present invention.

Please refer to FIG. 5. FIG. 5 depicts a state model 60 for a layer 2 interface of wireless communications device according to the present invention. The state model 60 of the present invention provides a unique reset/suspend state 68 that enables the state model 60 to function based solely on inputs. The state model 60 with the reset/suspend state 68 thus does not require a wireless device to recall a previous state from which a transition occurred when transiting to a subsequent state. Internal consistency is thereby obtained in the present invention state model 60, with a corresponding easing of program implementation and a reduction of potential errors. A further advantage of the state model 60 is that the state model 60 is fully compatible with the prior art state model and corresponding protocols.

Figure 6:
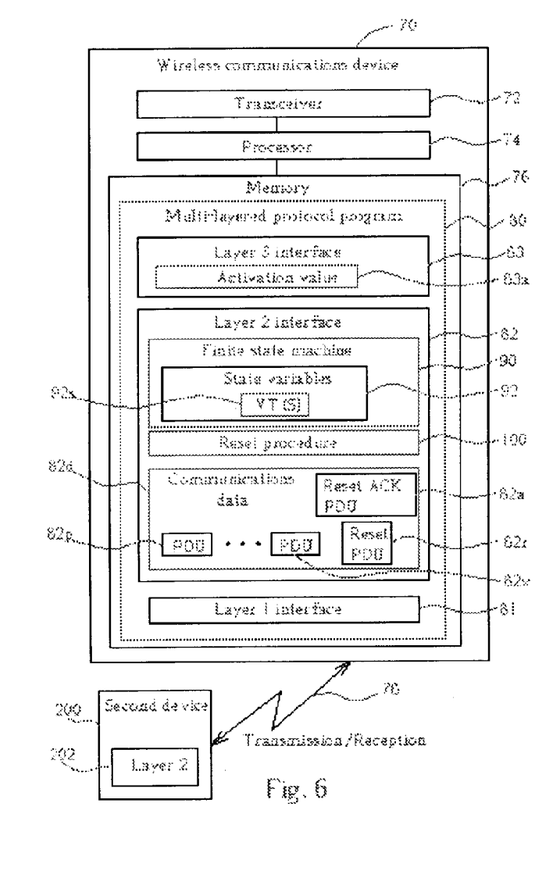
FIG. 6 presents a simplified block diagram a wireless communications device that implements the state model depicted in FIG. 5.

The state model 60 includes, in addition to the reset/suspend state 68, a null state 61, a data transfer state 62, a reset pending state 64 and a local suspend state 66. Please refer to FIG. 6 with reference to FIG. 5. FIG. 6 is a simplified block diagram of a wireless communications device 70 according to the present invention, which is capable of effecting multi-layered communications along one or more established channels 78 with a suitable second wireless device 200. The wireless communications device 70 comprises a processor 74 electrically connected to a transceiver 72 and a memory 76. The transceiver 72 is used to send and receive wireless signals, the operations of which are controlled by the processor 74. To control the transceiver 72, the processor 74 executes in the memory 76 a multi-layered protocol program 80. The multi-layered protocol program 80 is software that is used to effect a three-tiered communications protocol, which includes a layer 3 interface 83, a layer 2 interface 82 and a layer 1 interface 81. Although not shown in FIG. 6, in some embodiments, the layer 1 interface 81, or portions thereof, may be embedded within the transceiver 72.

Of particular concern to the present invention is the layer 2 interface 82, the software implementation of which includes a finite state machine 90 that conforms to the state model 60, and which is used for communications along a particular channel 78. That is, each channel 78 has a corresponding finite state machine 90 within the layer 2 interface 82. For purposes of simplicity in the following description, only one communications channel 78 is considered. During operations, the layer 2 interface 82 has layer 2 communications data 82d. The communications data 82d may be layer 3 data that is being processed before being passed to the layer 1 interface 81 for transmission, or may be layer 1 data that is being reassembled before being passed up to the layer 3 interface 83. The communications data 82d may also be layer 2 signaling data that is to be sent to, or is received from, a layer 2 interface 202 on the second wireless device 200.

The finite state machine 90 includes a plurality of state variables 92 that are required to properly implement the layer 2 interface 82 for the channel 78. An example of such a state variable 92 is VT(S) 92s, which holds the value of the sequence number (item 43 in FIG. 2) of a layer 2 protocol data unit 82p that is next to be transmitted. The layer 2 interface 82 also includes a reset procedure 100 that sets the state variables 92 to a default condition. For example, when the wireless communications device 70 is first turned on, the reset procedure 100 is executed to place the layer 2 interface 82 into a default condition, which includes placing a zero into VT(S) 92s, as the first PDU 82p to be transmitted along a newly created communications channel 78 should normally have a sequence number 43 of zero.

Initially, the finite state machine 90 is in the null state 61. While in the null state 61, the communications channel 78 is not established. This is in contrast to all the other states 62, 64, 66 and 68 in which the layer 2 interface 82 is in wireless communications with the layer 2 interface 202 of the second wireless device 200 along an established channel 78. While in the null state 61, there is thus no exchanging of layer 2 communications data 82d with the layer 2 interface 202. As noted previously with regards to the prior art, the layer 3 interface 83 can send commands (termed primitives) to the layer 2 interface 82. In particular, upon response to an establish primitive from the layer 3 interface 83, the layer 2 interface 82 transitions from the null state 61 to the data transfer state 62. That is, the finite state machine 90 goes from the null state 61 to the data transfer state 62. In the process of doing so, the layer 2 interface 82 works with the layer 1 interface 81 to establish a communications channel 78 with the layer 2 interface 202 on the second wireless device 200. The reset procedure 100 is also executed so as to place the state variables 92 for the new channel 78 into a default state. If at any time while in the data transfer state 62 the layer 2 interface 82 receives a release primitive from the layer 3 interface 83 for the channel 78, the finite state machine 90 will transition from the data transfer state 62 back to the null state 61. In the process of doing so, the finite state machine 90 shuts down the associated communications channel 78.

During communications with the second wireless device 200 and while the finite state machine 90 is in the data transfer state 62, the layer 2 interface 82 may determine that communications along the channel 78 are disrupted and that the channel 78 needs to be reset. The layer 2 interface 82 composes a layer 2 reset control PDU 82r, which is a layer 2 signaling PDU exchanged between the layer 2 interfaces 82 and 202, to reset the channel 78. The finite state machine 90 causes the reset control PDU 82r to be sent to the layer 2 interface 202, and then the finite state machine 90 transitions to the reset pending state 64. While the finite state machine 90 is in the reset pending state 64, the layer 2 interface 82 transmits no layer 2 communications data 82d along the channel 78. Other channels may be established with the second wireless device 200 over which layer 2 communications data 82d may be sent, but no communications data 82d is sent along the channel 78 whose corresponding finite state machine 90 is in the reset pending state 64. Upon reception of a reset acknowledge PDU 82a from the second wireless device 200, the finite state machine 90 executes the reset procedure 100, and then transitions from the reset pending state 64 back to the data transfer state 62. Like the reset control PDU 82r, the reset acknowledge PDU 82a is a type of layer 2 signaling PDU. It is also possible for the wireless communications device 70 to receive a reset control PDU 82r from the second wireless device 200. If the finite state machine 90 is in the data transfer state 62, upon reception of the reset control PDU 82r from the layer 2 interface 202, the finite state machine 90 sends a reset acknowledge PDU 82a to the layer 2 interface 202, and then executes the reset procedure 200 to reset the state variables 92 of the channel 78. The finite state machine 90 remains, however, in the data transfer state 62. Similarly, if the finite state machine 90 receives a reset control PDU 82r from the layer 2 interface 202 while in the reset pending state 64, the finite state machine 90 will respond by sending a reset acknowledge PDU 82a to the layer 2 interface 202. For the sake of consistency, the finite state machine 64 should also probably execute the reset procedure 100, though this is not totally necessary as this will happen upon the transition back to the data transfer state 62. In the meantime, the finite state machine remains in the reset pending state 64. As with the data transfer state 62, if the finite state machine 90 receives a release primitive from the layer 3 interface 83 while in the reset pending state 64, the finite state machine 90 will transition to the null state 61, and in the process of doing so shut down the corresponding communications channel 78.

It is also possible to temporarily halt layer 2 communications along the channel 78. This is usually done when changing the ciphering configuration of the channel 78. Ciphering is performed utilizing the sequence number 43 (of FIG. 2) of each individual layer 2 PDU 82p. A new ciphering configuration is used for PDUs 82x that have sequence number values 43 that are sequentially after an activation value 83a. To ensure proper communications along the channel 78, it is necessary that both the wireless communications device 70 and the second wireless device 200 agree upon the new ciphering configuration. Communications along the channel 78 are thus suspended for all PDUs 82x whose sequence number values 43 exceed the activation value 83a, and remains suspended until the wireless communications device 70 is assured that proper ciphering synchronization exists with the second wireless device 200. This is the primary purpose of the local suspend state 66. Ciphering is controlled by the layer 3 interface 83, and so it is the layer 3 interface 83 that sends a suspend primitive to the finite state machine 90. The suspend primitive indicates the activation value 83a to the finite state machine 90. Upon reception of the suspend primitive, the finite state machine 90 transitions from the data transfer state 62 to the local suspend state 66, and responds to the suspend primitive by passing a suspend confirmation message to the layer 3 interface 83. While in the local suspend state 66, the finite state machine 90 transmits along channel 78 any layer 2 PDUs 82p that have sequence number values 43 that are sequentially before the activation value 83a, using the old ciphering configuration. PDUs 82x having sequence number values 43 that are sequentially after the activation value 83a are not transmitted. Transmission along the channel 78 is thus suspended after an event indicated by the layer 3 interface 83, i.e., the activation value 83a. Upon reception of a resume primitive from the layer 3 interface 83, the finite state machine 90 transitions back to the data transfer state 62 from the local suspend state 66. As with both the reset pending state 64 and the data transfer state 62, upon reception of the release primitive from the layer 3 interface 83, the finite state machine 90 transitions into the null state 61 from the local suspend state 66, terminating the associated channel 78 in the process.

The reset/suspend state 68 exists for those rare situations in which the finite state machine 90 is both suspended, as per the local suspend state 66, and awaiting a reset acknowledge PDU 82a along the associated channel 78 from the second wireless device 200. This may occur when the finite state machine 90 determines that the communications channel 78 is to be reset while in the local suspend state 66, or when the layer 3 interface 83 issues a suspend primitive while the finite state machine 90 is in the reset pending state 64. The reset/suspend state 68 is similar to the reset pending state 64 in that no layer 2 communications data 82d is transmitted by the wireless communications device 70 along the channel 78 while the associated finite state machine 90 is in the reset/ suspend state 68. The finite state machine 90 will transition into the reset/suspend state 68 from the reset pending state 64 on reception of a suspend primitive from the layer 3 interface 83. In this transition, the finite state machine 90 responds to the suspend primitive with a suspend confirmation message to the layer 3 interface 83, analogous to state transitions between the data transfer state 62 and the local suspend state 66. Alternatively, the finite state machine 90 will transition into the reset/suspend state 68 from the local suspend state 66 upon determination that the channel 78 needs to be reset because protocol errors are detected by the layer 2 interface 82 on the channel 78. Under this transition, the finite state machine 90 sends a reset command PDU 82r to the second wireless device 200, and then transitions into the reset/suspend state 68. Transitioning out of the reset/suspend state 68 depends only upon the external inputs into the finite state machine 90, i.e., primitives received from the layer 3 interface 83, or layer 2 signaling PDUs from the layer 2 interface 202 of the second wireless device 200. The finite state machine 90 is not required to recall a previous state in order to transition to a subsequent state. While in the reset/suspend state 68, the finite state machine 90 will transition to the reset pending state 64 upon receiving a resume primitive from the layer 3 interface 83. Or, the finite state machine 90 will transition from the reset/suspend state 68 to the local suspend state 66 upon reception of a reset acknowledge PDU 82a along the associated channel 78 from the second wireless device 200, and consequently causing the reset procedure 100 to be executed to reset the channel 78. As with all the other states in which an established channel 78 exists, the finite state machine 90 will transition into the null state 61 from the reset/suspend state 68 upon reception of a release primitive from the layer 3 interface 83, terminating the associated channel 78 in the process.

In contrast to the prior art, the present invention provides a wireless communications device with a finite state machine that has a unique reset/suspend state. The reset/suspend state is used to explicitly support those conditions in which both a channel reset and a channel suspend operation are being simultaneously performed. The reset/suspend state enables the finite state machine to operate in a "state memoryless" condition, in that the finite state machine is not required to recall a previous state in order to determine transitions to a next state from a current state. The reset/suspend state thus provides a more consistent state machine design, and is consequently less likely to suffer from errors in implementation.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A wireless communications device adapted to transact muti-layered communications with a second wireless device, the wireless communications device comprising a processor, and a program in memory to be executed by the processor to effect a multi-layered communications protocol, the multi-layered communications protocol comprising a layer 3 interface in communications with a layer 2 interface, the layer 2 interface having layer 2 communications data, the layer 2 interface comprising:

a null state in which the layer 2 interface has no established layer 2 wireless connection with the second wireless device;

a data transfer state in which the layer 2 interface is in wireless communications with a layer 2 interface on the second wireless device and transmits the layer 2 communications data to the layer 2 interface on the second wireless device, the processor switching from the null state to the data transfer state according to an establish primitive from the layer 3 interface, and switching from the data transfer state to the null state according to a release primitive from the layer 3 interface;

a reset pending state in which the layer 2 interface is in wireless communications with the layer 2 interface on the second wireless device and the transmission of the layer 2 communications data is halted, the processor switching from the data transfer state to the reset pending state when a protocol error is found by the layer 2 interface, switching from the reset pending state to the data transfer state according to a reset acknowledge signal received from the second wireless device, and switching from the reset pending state to the null state according to the release primitive from the layer 3 interface;

a local suspend state in which the layer 2 interface is in wireless communications with the layer 2 interface on the second wireless device and halts the transmission of the layer 2 communications data after a predetermined event indicated by the layer 3 interface, the processor switching from the data transfer state to the local suspend state according to a suspend primitive from the layer 3 interface, switching from the local suspend state to the data transfer state according to a resume primitive from the layer 3 interface, and switching from the local suspend state to the null state according to the release primitive from the layer 3 interface; and a reset/suspend state in which the layer 2 interface is in wireless communications with the layer 2 interface on the second wireless device and the transmission of the layer 2 communications data is halted, the processor switching from the reset/suspend state to the reset pending state according to the resume primitive from the layer 3 interface, switching from the reset pending state to the reset/suspend state according to the suspend primitive from the layer 3 interface, switching from the reset/suspend state to the local suspend state according to the reset acknowledge signal received from the second wireless device, switching from the local suspend state to the reset/suspend state when a protocol error is found by the layer 2 interface, and switching from the reset/suspend state to the null state according to the release primitive from the layer 3 interface.

2. The wireless communications device of claim 1 wherein the memory further comprises a reset routine for resetting the layer 2 interface, and the processor executes the reset routine when the processor switches from the reset pending state to another state.

3. The wireless communications device of claim 2 wherein when the processor is in the data transfer state and is switching to the reset pending state when a protocol error is found by the layer 2 interface, the wireless communications device transmits a reset signal to the second wireless device.

4. The wireless communications device of claim 2 wherein when the processor is in the data transfer state and receives a reset signal from the second wireless device, the processor executes the reset routine, and the wireless communications device transmits a reset acknowledge signal to the second wireless device.

5. The wireless communication device of claim 1 wherein the layer 2 interface comprises a finite state machine to implement the reset/suspend state.

* * * * *